United States Patent [19]

Scheurecker et al.

[11] 4,076,341
[45] Feb. 28, 1978

[54] FASTENING ARRANGEMENT FOR A LONGITUDINALLY MULTIPLY DIVIDED ROLLER TO BE USED IN CONTINUOUS CASTING PLANTS

[75] Inventors: Werner Scheurecker, Linz; Franz Kagerhuber, Traun, both of Austria

[73] Assignee: Vereinigte Osterreichische Eisen- und Stahlwerke-Alpine Montan Aktiengesellschaft, Linz, Austria

[21] Appl. No.: 705,288

[22] Filed: Jul. 14, 1976

[30] Foreign Application Priority Data

Jul. 18, 1975 Austria ................................ 5572/75

[51] Int. Cl.² ............................................. F16C 35/04
[52] U.S. Cl. .................................... 308/20; 29/116 R
[58] Field of Search ............... 308/15, 20, 27, 207 R, 308/DIG. 10; 198/780; 29/116 R, 124, 117; 193/37

[56] References Cited

U.S. PATENT DOCUMENTS

| 1,633,153 | 6/1927 | Wray | 308/20 X |
| 2,613,117 | 10/1952 | Lee | 308/20 |
| 2,843,432 | 7/1958 | Kindig | 308/20 |

FOREIGN PATENT DOCUMENTS 16,197 of 1909 United Kingdom ................... 308/20

*Primary Examiner*—Trygve M. Blix
*Assistant Examiner*—Douglas C. Butler
*Attorney, Agent, or Firm*—Brumbaugh, Graves, Donohue & Raymond

[57] ABSTRACT

A fastening arrangement for a roller that is divided a number of times and is to be used in a continuous casting plant has supporting brackets arranged in the longitudinal direction of the roller. The brackets are provided with pocket-like recesses for accommodating outer and inner roller holding devices therein. Detachable bolting devices connect the outer roller holding devices with their respective supporting brackets, while the inner roller holding devices rest loosely in the respective pocket-like recesses.

8 Claims, 4 Drawing Figures

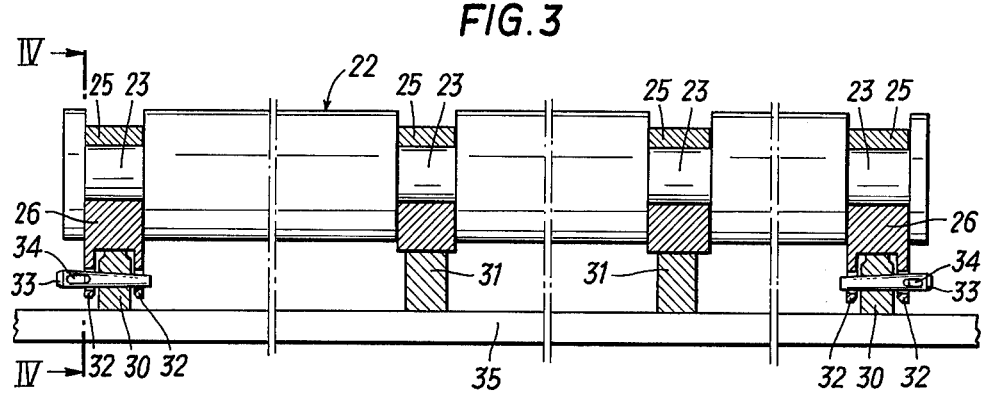
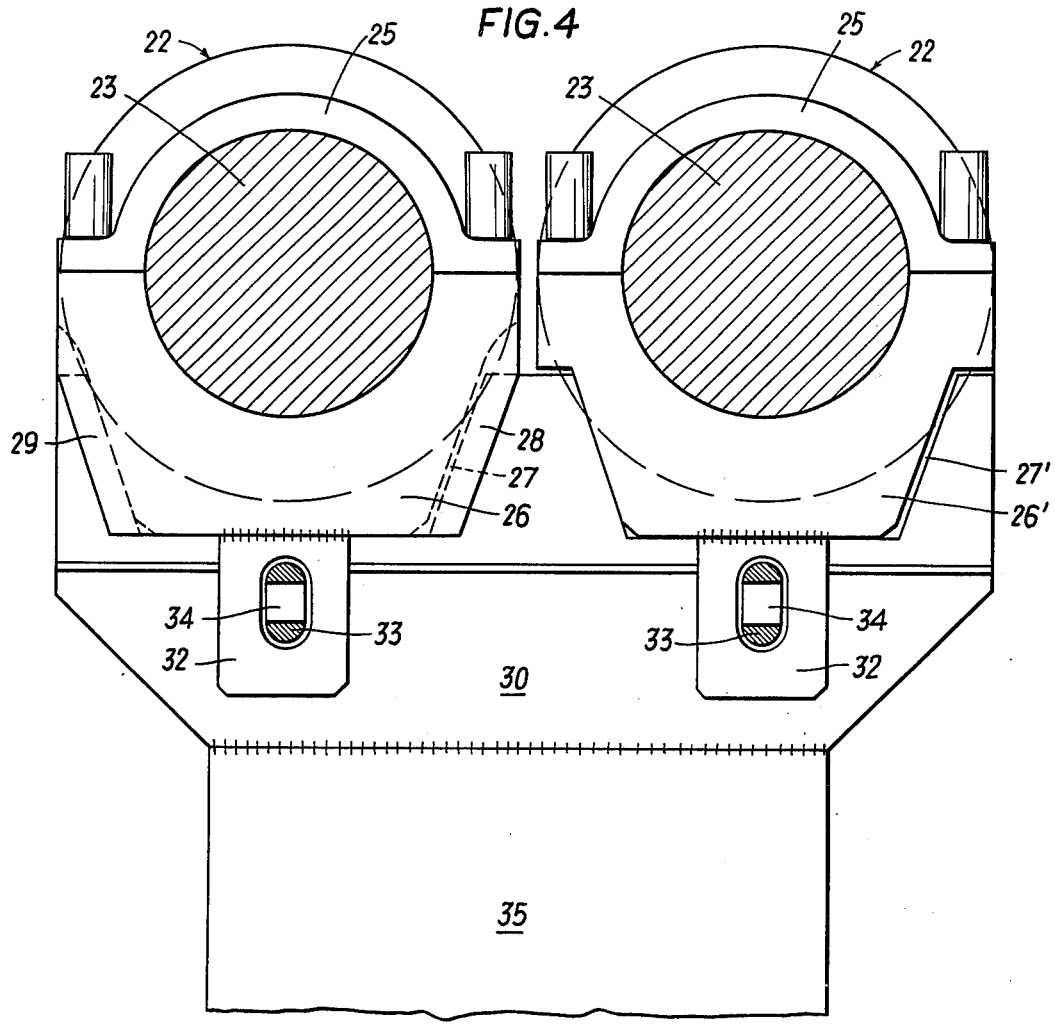

FASTENING ARRANGEMENT FOR A LONGITUDINALLY MULTIPLY DIVIDED ROLLER TO BE USED IN CONTINUOUS CASTING PLANTS

BACKGROUND OF THE INVENTION

The invention relates to a fastening arrangement for rollers which are divided a number of times in their longitudinal direction and are to be used in continuous casting plants, which rollers are exchangeably installed by roller holding means on the strand guide support.

In continuous casting plants, in particular in continuous casting plants for the casting of slabs having a great width, a great number of supporting rollers are densely arranged next to one another below the mould in order to counteract a bulging of the strand caused by the ferrostatic pressure of the liquid core of the strand. In modern continuous casting plants for slabs, supporting rollers having as small a diameter as possible are installed in order to keep small the distance between two supporting roller axes and thus the bulging of the strand between two supporting rollers. In order to keep within limits the sagging of these long and relatively thin rollers due to the load of the strand it is necessary to provide for a number of intermediate bearings over the longitudinal extensions of the rollers.

It has been known to mount a supporting roller formed by a number of roller bodies arranged one behind the other on a common, non-rotatably mounted axis in such a manner that supporting members or axle holders engage between the individual roller bodies, which supporting members or axle holders in turn are supported by and secured on curved longitudinal carriers or back-up beams of a stationary frame construction.

Furthermore it has been known to provide the rollers or rolls with annular recesses distributed over their longitudinal extensions, whereby relatively narrow, substantially cylindrical bearing pins are formed. The pins are mounted in bearings whose bearing height, taken from the bearing center towards the strand skin, is smaller than the radius of the rollers or rolls. The bearings are supported on and secured to supporting construction.

One of the problems of these rollers having a number of bearing places in their longitudinal direction is the fastening of the rollers on the strand guide support, since only the bearing places at the two ends of a roller are easily accessible. The other bearing places arranged inwardly in the longitudinal direction of the roller are difficult to reach or can be reached only when the roller paths supporting the strand on its upper and lower sides have been moved apart. Therefore an installation or a removal of the roller is very difficult. Thus, one has to carry out manipulations at the inwardly arranged bearing places of the rollers, in order to detach or attach the fastening means of the roller holding means arranged there.

SUMMARY OF THE INVENTION

The invention aims at preventing the above-described disadvantages and difficulties and has as its object to create a roller fastening means of the above-defined kind, which allows for easy installation and removal of the rollers and wherein the roller holding means arranged inwardly in the axial direction of a roller need not be accessible. Furthermore, easy installation and removability is also to be guaranteed for continuous casting plants which have been in operation for some time, i.e. unavoidable rust and scale deposits are not to impair the installation and removal of a roller.

This object of the invention is achieved in that the roller holding means are inserted in pocket-like recesses of supporting brackets arranged in the longitudinal direction of the roller axis, which brackets are connected with the strand guide support. The outer roller holding means are connected with the respective supporting brackets by detachable bolting means, while all the inner roller holding means rest loosely in the pocket-like recesses.

A preferred embodiment is characterised in that the pocket-like recesses of the supporting brackets are designed to widen trapezoidally towards the roller.

It is advantageous to insert the roller holding means with play into the pocket-like recesses of the supporting brackets. Thereby the roller to be removed can easily be detached with the roller holding means from the supporting brackets without the application of a great force.

Suitably, the supporting brackets are secured to longitudinal carriers of the strand guide support, each supporting bracket having two or more pocket-like recesses for accommodating the roller holding means of subsequent rollers.

According to a further feature of the invention, the outer roller holding means are connected with the respective supporting brackets by a wedge connection. The wedge connection enables an especially easy and quick detachment or fastening of the roller on the strand guide support. Even a great deal of rust and dirt due to scales does not impair the pushing in and out of the wedge.

Suitably, the wedge penetrates two straps of the roller holding means with play and one conical bore of the supporting bracket in a force-locking manner.

According to another embodiment of the invention the wedge penetrates the supporting bracket with play and the straps of the roller holding means in a force-locking manner.

The wedge connection advantageously is formed by two straps of the roller holding means having one conical bore each and a catch with a bore secured to the supporting bracket between the straps, the wedge penetrating the bores and connecting the three parts.

BRIEF DESCRIPTION OF THE DRAWINGS

The invention shall now be described by way of two examples and with reference to the accompanying drawings, wherein:

FIG. 3 shows a section analogous to FIG. 1, through a roller according to another embodiment of the invention, and FIG. 4 is a section according to line IV—IV of FIG. 3.

DESCRIPTION OF EXEMPLARY EMBODIMENTS

Figure 1:
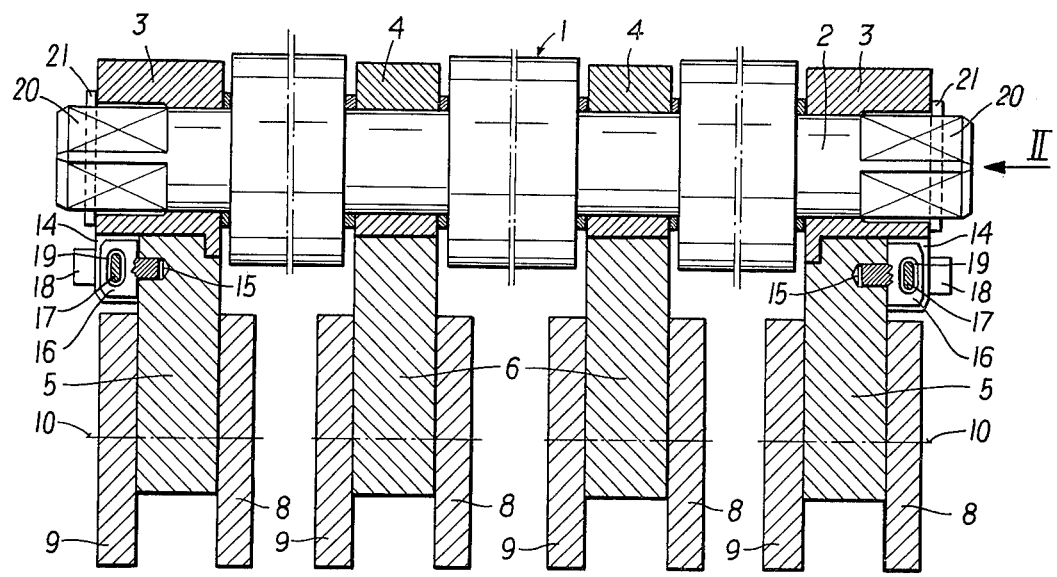
FIG. 1 is a schematically illustrated section in the longitudinal direction of a roller through the holding means and supporting brackets according to one embodiment of the invention.
Figure 2:
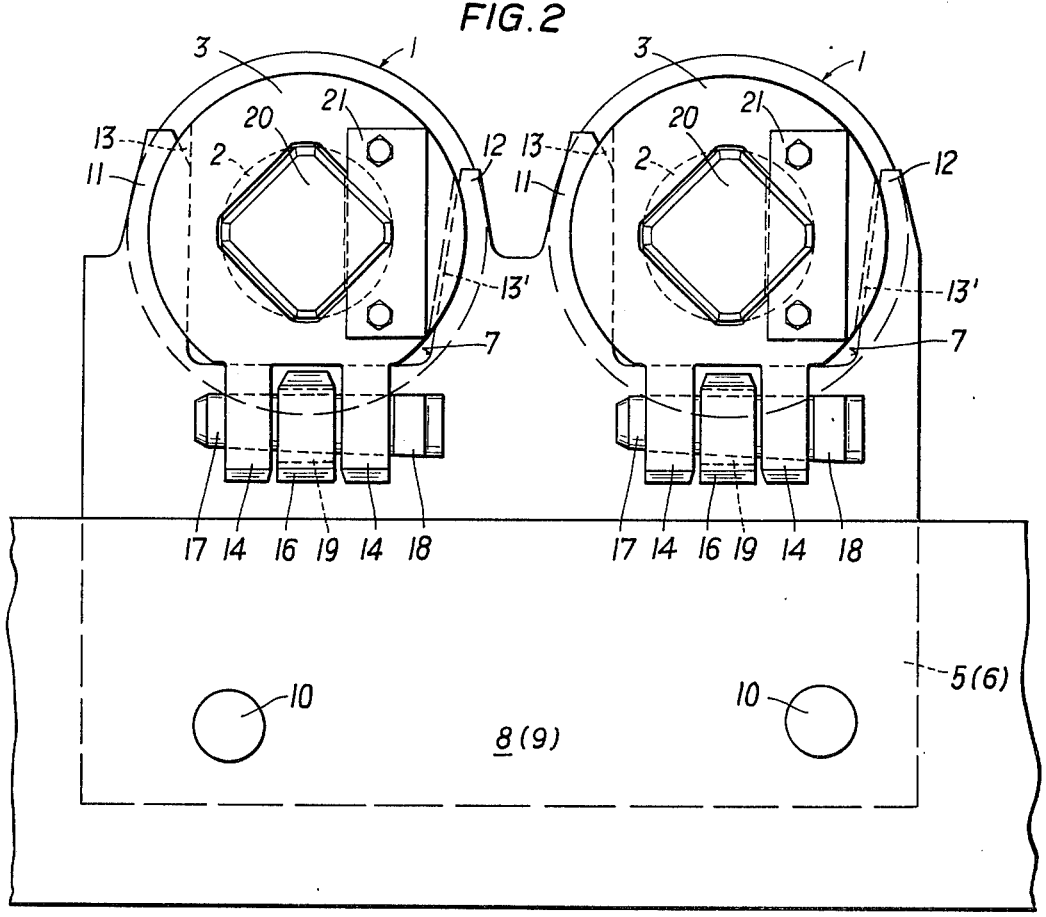
FIG. 2 is a front view in the direction of the arrow II of FIG. 1.

In FIGS. 1 and 2 roller bodies of a supporting roller, that supports the surface of a strand and is rotatably mounted on a fixed axle 2, are denoted with 1. The axle 2 is arranged in roller holding means 3 and 4 provided between the individual roller bodies, the roller holding means 3 and 4 being inserted in pocket-like recesses 7 of supporting brackets 5 and 6. The supporting brackets 5 and 6 are each inserted between two longitudinal carriers 8 and 9 and are secured to them by means of bolts 10. Each supporting bracket 5 and 6 has two of the pocket-like recesses 7, the recesses being trapezoidally designed so as to widen towards the roller. The roller holding means 3 and 4 have a shape corresponding to the pocket-like recesses 7 in order to fit therein with play. The side walls 11 and 12 that define the recesses 7 are somewhat narrower than the roller holding means 3 and 4 and engage in grooves 13 and 13' of the roller holding means 3 and 4 so as to secure the roller holding means against a displacement in the direction of the roller axis.

The two roller holding means 3 provided on the ends of the supporting rollers are outwardly extended over the supporting brackets in the axial direction of the roller and these extensions are welded to two straps 14 pointing towards the supporting bracket 5. A catch 16 inserted into a bore 15 of the supporting bracket 5 reaches between these two straps 14. A wedge 17 penetrates the two straps in a force-locking manner and a bore 19 of the catch 16 with play. In this way the axle 2 of the roller body 1 is secured in the supporting bracket against falling out, but has a slight play—about 1 mm. The rollers provided for supporting the upper side of the strand are secured to the longitudinal carriers in the same manner and are held in the supporting brackets by the wedges 17 which must only accommodate the weight of the roller and the roller holding means. Loads acting on the rollers and applied by the strand are accommodated by the supporting brackets 5 and 6, in that the roller holding means 3 and 4 are well set in the supporting brackets 5 and 6. The wedges 17 are provided with a catch 18 facilitating the knocking out of the wedges.

In order to keep the effects resulting from a sagging of the rollers as slight as possible, the wedges 17 are positioned as close as possible toward the supporting center of the supporting bracket 5. As can be seen from the drawings, the inwardly arranged supporting brackets 6 are provided for supporting of the roller only, and it is not necessary to carry out manipulations on the supporting brackets 6 for installing or removing a roller. The axle 2 of the roller is provided with squared ends 20 for securing it against turning and with plates 21 secured to the roller holding means 3 for securing it against displacement in the axial direction, which plates partly penetrate the axle 2.

A further roller fastening according to the invention is shown by FIGS. 3 and 4. The roller 22 is provided with annular recesses distributed over its longitudinal extension, whereby cylindrical bearing pins 23 are formed. Each one of these bearing pins 23 is inserted in a bearing comprised of a bearing upper part 25 and a bearing lower part 26 or 26'. The bearing lower parts 26 and 26' are inserted in trapezoidal pocket-like recesses 27 and 27' of the supporting brackets 30 and 31, respectively, which recesses widen towards the roller. The recess 27 is provided with projections 28 and 29 at its lateral walls, which projections engage with corresponding grooves of the bearing lower part 26, securing it in the direction of the roller axis. The bearing lower part 26' and its corresponding pocket-like recess 27' constitutes a simpler embodiment of the roller fastening of the invention without a key and slot connection.

The bearing lower parts 26 and 26' provided on the roller ends span the supporting brackets 30 at two opposite sides by means of two straps 32. A wedge 33 provided with an elongated slot 34 penetrates the straps 32 with play and the supporting brackets arranged between the straps in a force-locking manner. The wedge 33 is detached by pushing a transverse wedge into the elongated slot 34. Manipulations at the inwardly arranged supporting brackets 31 thus are no longer required for installing and removing a roller 22.

Each one of the supporting brackets 30 and 31 serves for accommodating two rollers 22 and is supported on a backup transversal carrier 35.

What we claim is:

1. A fastening arrangement for a roller divided into multiple sections along its longitudinal extent, said roller to be used in continuous casting plants having a strand guide support, the arrangement comprising:

supporting brackets arranged in the longitudinal direction of the roller at the ends of each section, said brackets being connected to said strand guide support and having pocket-like recesses;

outer and inner roller holding means for exchangeably installing the roller in the strand guide support and being inserted in said pocket-like recesses of said supporting brackets, said outer roller holding means being at the ends of said roller and said inner roller holding means being at the junctions of the multiple sections of the roller;

detachable bolting means for connecting the outer roller holding means with their respective supporting brackets, the inner roller holding means lying loosely and unsecured in the respective pocket-like recesses of said supporting brackets.

2. A fastening arrangement as set forth in claim 1, wherein the pocket-like recesses of the supporting brackets are trapezoidal and widened towards the roller.

3. A fastening arrangement as set forth in claim 1, wherein the outer and inner roller holding means are inserted with play in the pocket-like recesses of said supporting brackets.

4. A fastening arrangement as set forth in claim 1, wherein the detachable bolting means are wedge connections for connecting the outer roller holding means with their respective supporting brackets.

5. A fastening arrangement for a roller divided into multiple sections along its longitudinal extent, said roller to be used in continuous casting plants having a strand guide support with longitudinal carriers, the arrangement comprising:

supporting brackets arranged in the longitudinal direction of the roller at the ends of each section, said brackets being connected to said longitudinal carriers and each supporting bracket having at least two pocket-like recesses;

outer and inner roller holding means for exchangeably installing the roller in the strand guide support and being inserted in one of said pocket-like recesses of said supporting brackets with a subsequent roller being inserted in the other of said pocket-like recesses via other roller holding means; and detachable holding means for connecting the outer roller holding means with their respective supporting brackets, the inner holding means lying loosely in the respective pocket-like recesses of said supporting brackets.

6. A fastening arrangement for a roller divided into multiple sections along its longitudinal extent, said roller to be used in continuous casting plants having a strand guide support, the arrangement comprising:
- supporting brackets arranged in the longitudinal direction of the roller at the ends of each section, said brackets being connected to said strand guide support and having pocket-like recesses;
- outer and inner roller holding means for exchangeably installing the roller in the strand guide support and being inserted in said pocket-like recesses of said supporting brackets, each outer roller holding means having two straps with passages therethrough, the supporting brackets associated with said outer roller holding means being provided with one conical bore each; and
- detachable bolting means in the form of wedges for connecting the outer roller holding means with their respective supporting brackets by penetrating the passages of the two straps with play and the conical bore of said outer roller holding means in a force-locking manner, the inner roller holding means lying loosely in the respective pocket-like recesses of said supporting brackets.

7. A fastening arrangement for a roller divided into multiple sections along its longitudinal extent, said roller to be used in continuous casting plants having a strand guide support, the arrangement comprising:
- supporting brackets arranged in the longitudinal direction of the roller at the ends of each section, said brackets being connected to said strand guide support and having pocket-like recesses;
- outer and inner roller holding means for exchangeably installing the roller in the strand guide support and being inserted in said pocket-like recesses of said supporting brackets, each outer roller holding means having a plurality of straps with passages therethrough, the supporting brackets associated with said outer roller holding means being provided with one bore each; and
- detachable bolting means in the form of wedges for connecting the outer roller holding means with their respective supporting brackets by penetrating the bore of the respective supporting bracket with play and the passages of the straps in a force-locking manner, the inner roller holding means lying loosely in the respective pocket-like recesses of said supporting brackets.

8. A fastening arrangement as set forth in claim 7, wherein two straps are provided on each outer roller holding means and the passages are in the form of one conical bore through each pair of straps, and further comprising a catch secured to the respective supporting bracket between the two straps, the bore of the supporting bracket passing therethrough, the wedge penetrating the bores thus connecting the two straps and the catch.

* * * * *